Figure 1:
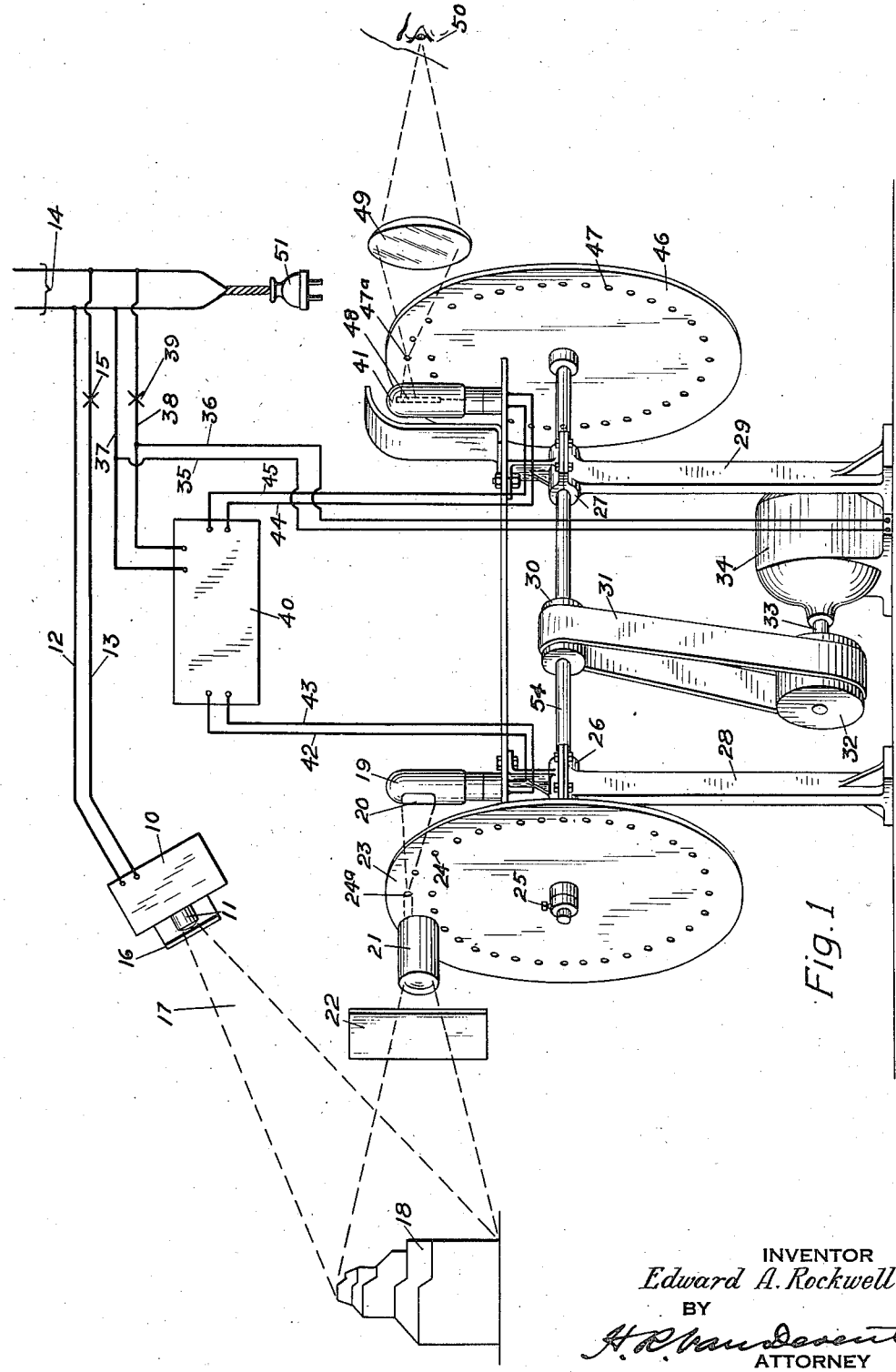

Jan. 21, 1936.  E. A. ROCKWELL  2,028,475
LIGHT CONVERSION SYSTEM
Filed Aug. 29, 1933

INVENTOR
Edward A. Rockwell
BY
ATTORNEY

Patented Jan. 21, 1936

2,028,475

UNITED STATES PATENT OFFICE 2,028,475

LIGHT CONVERSION SYSTEM

Edward A. Rockwell, Chicago, Ill., assignor to Patent Engineering Corporation, a corporation of Delaware Application August 29, 1933, Serial No. 687,253

1 Claim. (Cl. 178—6)

This invention relates to improvements in light conversion systems and has for an object the provision wherein invisible light radiations are made visible to the human eye.

Another object of the invention is the provision of apparatus for projecting a beam of invisible rays upon an object or objects, and means for converting reflected invisible light from the object or objects into visible light.

A further object of the invention is the provision of apparatus having two scanning devices, fixed relative to each other, one of the scanners adapted to scan the invisible rays passing to a light sensitive cell and the other adapted to scan the amplified and reproduced impulses resulting from the action of the first scanner, thereby producing at the second scanner a visible image of the object reflecting the invisible rays.

Other objects of the invention will be obvious to those skilled in the art.

One embodiment of the invention is shown diagrammatically and partly in perspective in the drawing for the purpose of illustrating the invention.

Referring to the drawing, a projector 10 is provided with a suitable lens 11. Inside the projector 10 a suitable source of illumination (not shown) is provided. The illumination from this source may be, for example, an incandescent lamp or an arc lamp, and should provide a high content of light having long waves of such length as to be beyond the range of visibility to the human eye. Such rays of light are usually termed "infra-red" rays.

In some cases, it may be preferable to use a light which is rich in very short waves which are also beyond the range of the human eye and commonly known as "ultra-violet" rays.

Both types of rays readily penetrate fog, but as the "infra-red" rays are more suitable for the purposes set forth in this specification, the description will be confined to "infra-red" rays, but it is understood that "ultra-violet" rays may be used in the same manner described herein.

Fog is composed of minute particles of water usually varying from one to ten microns in diameter, a micron being about 1/25000th of an inch. These minute particles non-selectively reflect and refract rays of light. It is surprising how little actual water there is in a fog. If all of the water from a layer of fog a mile thick were to be deposited into a layer, the thickness of this layer would only be approximately 1/25th of an inch.

Fog is a great hazard to navigation both on the water and in the air.

The projector 10 is connected via wires 12 and 13 to a source of current 14 and a suitable switch 15 may be provided for controlling the current flowing to the projector. The projector may also be provided with a screen or filter 16 which only allows the infra-red rays to pass through. A beam 17 of infra-red light may be thrown upon an object 18 and suitable instrumentalities may be provided for receiving infra-red rays reflected from the object and transforming or converting these invisible rays into rays visible to the human eye. A light sensitive cell 19, having a window 20, is provided and preferably should be extremely sensitive to infra-red rays. A lens system 21 is directed toward the object 18 and is so positioned relative to the cell 19 that the active elements of the cell are in the focal plane of the lens system. A screen or filter 22, designed to allow only infra-red rays to pass therethrough, is positioned between the lens system 21 and the object 18.

Reflected infra-red rays from the object 18 are focused upon the active elements of the cell 19 by means of the lens system 21. A scanning disc 23, provided with a plurality of small openings 24, is positioned between the lens system 21 and the cell 19 and this disc, when rotated, scans the image reflected by the object 18, allowing a plurality of successive points of infra-red light to successively fall upon the active elements of the cell 19, accomplishing what is commonly known as "scanning".

The scanning disc 23 is secured to a shaft 54 by means of a set screw 25, or any other suitable means, and the shaft 54 is journaled in suitable bearings 26 and 27 mounted on the standards 28 and 29, respectively. A pulley 30 is secured to the shaft 54 and is driven by means of a belt 31, which is in turn driven by a pulley 32 carried on the shaft 33 of an electric motor 34. This motor is connected to the source of current 14 by means of wires 35 and 36, which are attached on to the wires 37 and 38, respectively. The current flowing through these wires may be controlled by a switch 39 provided in the wire 38. The wires 37 and 38 also furnish power for an amplifier, designated by the numeral 40. As amplifiers are well-known in the art, the amplifier 40 shown diagrammatically may be of any character suitable for amplifying impulses from the cell 19 and delivering the same to a suitable device for producing visible light, for example, the neon lamp 41. Impulses from the cell 19 are led to the amplifier 40 by means of the wires 42 and 43, and the amplified impulses are delivered to the neon lamp by means of wires 44 and 45. A second scanning disc 46 is also secured to the shaft 54. This disc is provided with a series of holes 47 matching the holes in the disc 23 both in number and position relative to each other. In other words, when the extreme outer hole 24a is in line with the beam of light passing to the cell 19, the extreme outer hole 47a is in line with the neon lamp 41, so that when the disc 23 is scanning the active element of the cell 19 the disc 46 is synchronously scanning the plate 48 of the neon lamp 41. As both of these discs are firmly fixed to the shaft 54, once the discs are assembled on this shaft and firmly secured thereto in synchronism, a further synchronizing of the device is unnecessary.

Another feature of this arrangement is that variations in the rotation of the discs would not affect the operation of the device.

For viewing the received image, a suitable lens 49 may be provided so that when the eye 50 is in line with the lens the image may be seen. A suitable connector plug 51 is provided for connecting all of the electrical circuits to a source of current.

A device of this character may be installed on a ship or airplane and by throwing a beam of infra-red light upon an object and by receiving the reflected rays and amplifying them in the manner described, an object may be seen at night in total darkness or when passing through fog.

While a simple embodiment of the invention is shown and described so that the principle may be understood, it is obvious that many variations in construction of the device may be made without departing from the spirit of the invention as recited in the following claim.

What is claimed is:

In a device of the character described a shaft, a pair of pedestals carrying journals for said shaft, a scanning disc secured to said shaft at one end thereof, a second scanning disc secured to said shaft at the other end thereof, the relative positions of the two scanning discs being adjustable thereon, a shelf supported by said pedestals, a photo-electric cell carried by said shelf and positioned adjacent one of said scanning discs, a receiving lamp also carried by said shelf and positioned adjacent to the other scanning disc, and amplifying means interconnected between said cell and said lamp.

EDWARD A. ROCKWELL.